United States Patent [19]

Ogawa et al.

[11] 4,306,788
[45] Dec. 22, 1981

[54] ELECTROMAGNETICALLY CONTROLLED SHUTTER

[75] Inventors: Yukio Ogawa, Kawasaki; Michio Hirohata, Inagi; Tetsuya Taguchi, Kawasaki, all of Japan

[73] Assignee: Canon Kabushiki Kaisha, Tokyo, Japan

[21] Appl. No.: 67,228

[22] Filed: Aug. 17, 1979

[30] Foreign Application Priority Data

Aug. 22, 1978 [JP] Japan .................. 53-102084

[51] Int. Cl.³ .................. G03B 7/08; G03B 9/08; H02K 41/00
[52] U.S. Cl. .................. 354/49; 354/51; 354/235
[58] Field of Search .......... 354/29, 30, 38, 42–44, 354/49–51, 59, 233–235, 258, 228–232, 271, 288; 310/13, 27; 318/135; 335/219, 222; 352/142

[56] References Cited

U.S. PATENT DOCUMENTS

| 3,724,350 | 4/1973 | Mielke | 354/234 |
| 3,816,777 | 6/1974 | Metzgar | 310/27 |
| 4,100,558 | 7/1978 | Koike et al. | 354/271 |

*Primary Examiner*—L. T. Hix
*Assistant Examiner*—William B. Perkey
*Attorney, Agent, or Firm*—Toren, McGeady & Stanger

[57] ABSTRACT

An electromagnetic actuating device for controlling the opening and closing operation of a shutter includes a plurality of plate-like permanent magnets and yokes alternating in layers to form a plurality of magnetic paths, and a moving coil arranged to be movable in a space provided in said magnetic paths. The device is thus minimized in bulk and size, can be built into the shutter casing, and rendered operable with electrical energy consumption kept to a minimum.

4 Claims, 9 Drawing Figures

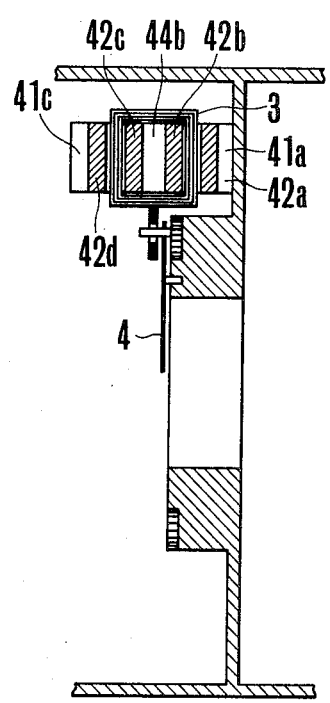

ELECTROMAGNETICALLY CONTROLLED SHUTTER

BACKGROUND OF THE INVENTION

1. Field of the Invention

This invention relates to photographic cameras, and, more particularly, to a shutter arrangement wherein the shutter blades are opened and closed by electromagnetic force.

2. Description of the Prior Art

For the drive source for opening and closing the shutter blades in conventional cameras, use has generally been made of the righting moment of a mechanically tensioned spring. When the film winding operation is performed, the above-identified spring is charged. Then, upon depression of the release button, the shutter is opened. The duration of the exposure time is controlled by a mechanical governor, or a timing circuit, and is terminated by closing the shutter. In any case, the direct drive for the shutter blades relies upon the power mechanically released from the tensioned spring.

It is also known in the art to provide an electromagnetically controlled shutter wherein a tubular coil is arranged in the magnetic field of a permanent magnet upon conduction of current therethrough to effect reciprocating movement by which the shutter blades are opened and closed.

To facilitate incorporation of such electromagnetic actuating device in a narrow space available within the lens mount or barrel accommodating the shutter mechanism, many proposals have been made. These proposals concern the shape and form for minimizing the bulk and size while still preserving the high driving force exerted. To further facilitate minimization of electrical energy consumption by the actuating device, it is desired to transmit motion of the actuating device directly to the shutter drive ring or sector, as the armature of the electromagnetic actuating device is directly connected to the shutter drive ring.

With the foregoing in mind, an object of the present invention is to provide an electromagnetic actuating device for the shutter which overcomes the drawbacks of the conventional actuating device.

Another object of the present invention is to provide an electromagnetic actuating device constructed in the form suited for incorporation in a limited space within the interior of the lens barrel and operable with the limitation of electrical power consumption to a minimum while still preserving the high performance.

These and other objects will become apparent from the following detailed description taken in conjunction with the accompanying drawings in which:

DESCRIPTION OF THE PREFERRED EMBODIMENTS

Figure 1:
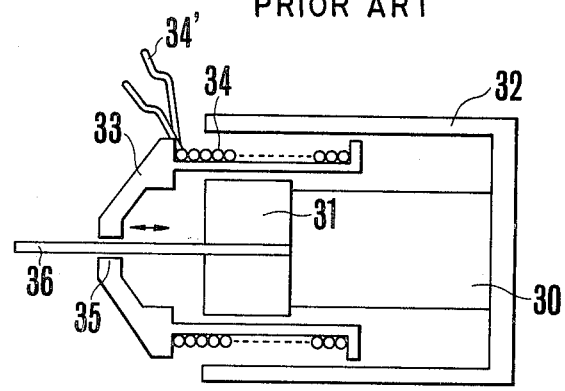
FIG. 1 is a sectional view showing an example of a conventional electromagnetic actuating device.

FIG. 1 shows a moving coil type magnetic actuating device. 30 is a cylindrical permanent magnet magnetized in the axial direction thereof and fixedly secured at one end thereof to a pole piece 31 and at the other end thereof to a yoke 32. The pole piece 31 is constructed in the cylindrical form, and made of soft magnetic material, and is fixedly secured to the above-described hollow yoke 32 at the central portion thereof in coaxial relation to each other along with the above-described permanent magnet 30. 33 is a coil bobbin. On its hollow cylindrical opening end portion is convoluted a coil 34. In the opposite end portion of the bobbin 33 there is bored a central hole 35 through which a guide shaft 36 extends from the central point of the pole piece 31, so that the coil bobbin structure is movable along this guide shaft 36 in either direction indicated by arrows. A pair of outlet lead wires of the coil 34 are indicated 34'. In operating the device of FIG. 1, when a current is allowed to flow through the coil 34, the coil bobbin 33 is driven to move in either direction perpendicular to the magnetic flux formed between the yoke and pole piece by the permanent magnet, depending upon the direction of current flow, while being guided by the guide shaft 36.

Since the incorporation of the electromagnetic actuating device of FIG. 1 in the lens mount barrel of the camera results in a lack of space availability and a limitation of electrical capacitance, in order to allow for high-speed movement of the bobbin without casing variation of the electrical capacitance, it is required either to increase the magnetic flux density in the gap between the pole piece and the yoke, or to increase the range of variation of the magnetic flux by the coil. These requirements can be fulfilled by making use of a larger permanent magnet for stronger magnetic flux, or by increasing the number of turns of the coil, with sacrificing the minimization of the bulk and size of the device to achieve. It is, therefore, more difficult to incorporate the device in the limited space within the lens mount barrel. Another disadvantage is that, since the body of the device is substantially cylindrical in shape, while the space which is to be occupied by the device is round, the size of the lens mount must be increased which is incompatible with the demand for compactness of the camera. To eliminate this disadvantage, an improvement has been proposed by altering the linear movement of the coil to a circular one as shown in FIG. 2.

Figure 2:
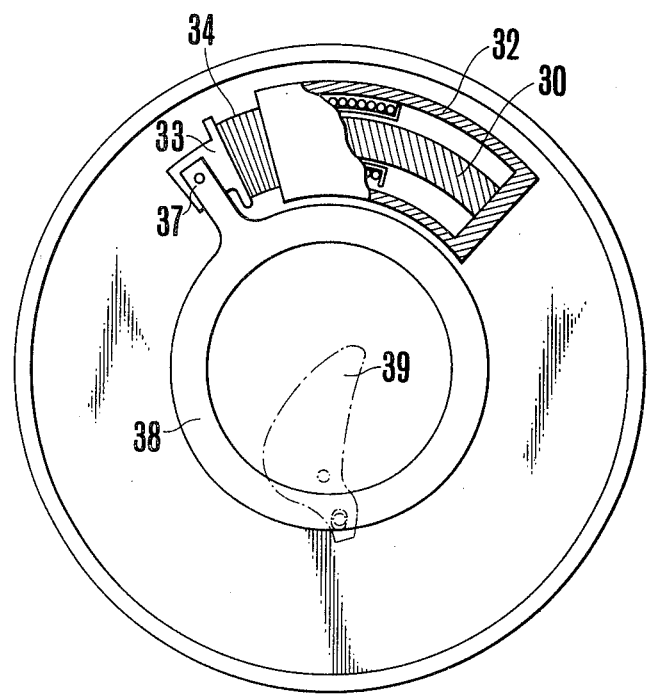
FIG. 2 is a side elevational view, partly in section, showing an example of an electromagnetically controlled shutter.

FIG. 2 shows an example of a conventional electromagnetically controlled shutter which provides an improvement for the above-described problem. In order that the electromagnetic actuating device fits in a ringlike space within the lens barrel, the permanent magnet 30, yoke 32 and bobbin 33 are made arcuate to a certain curvature. With the device of the figure, when the moving part of the coil 34 and bobbin 33 moves as rotating about the axis of the tubular lens mount barrel, the sector ring 38 fixedly secured to the bobbin 33 rotates, causing the shutter blades 39 to be opened or closed in a manner known in the art. It is to be understood that the configuration of the moving part to the space available within the lens mount barrel facilitates the incorporation of the device therein. Since the axis of the coil-carried bobbin in the device of the structure shown in FIG. 2 is not linear, it is, therefore, difficult not only to increase the number of turns of the coil around the bobbin, but also to manufacture hollow yokes economically while maintaining the dimensions within the specified tolerance.

The present invention is to provide a novel electromagnetic actuating device which has eliminated the above-described drawbacks of the conventional device. By using a bobbin-and-coil arrangement capable of linear movement, and by simplifying the structure, the device can be manufactured with ease, and therefore it is possible to reduce the production cost to a large extent.

Figure 3:
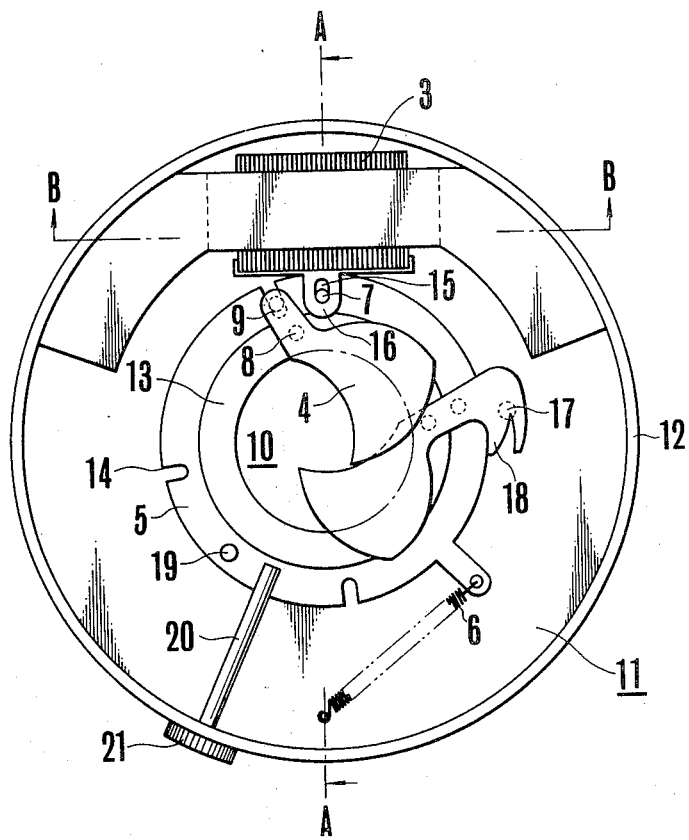
FIGS. 3 and 4 show one embodiment of an electromagnetically controlled shutter according to the present invention, with FIG. 3(a) being a front elevational view, FIG. 3(b) being a sectional view taken along a line A—A of FIG. 3(a), and FIG. 4 being a sectional view taken along a line B—B of FIG. 3(a).
Figure 4:
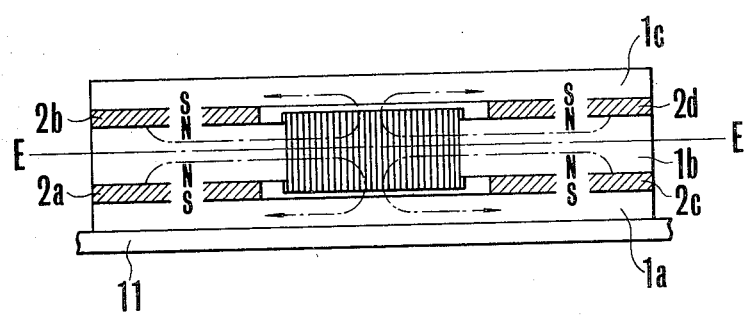
Figure 3:
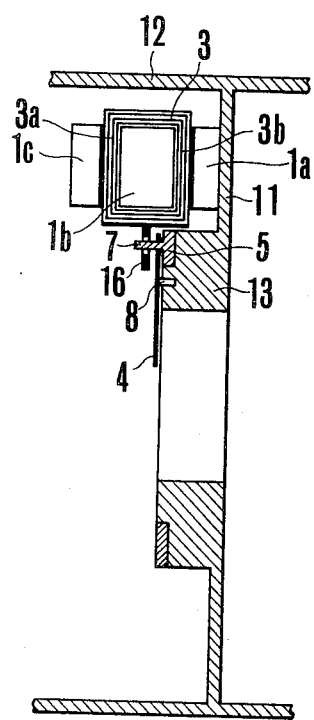

FIGS. 3 and 4 show one embodiment of an electromagnetically controlled shutter according to the present invention. FIG. 3(a) is an elevational view, FIG. 3(b) is a sectional view along A—A line of FIG. 3(a), and FIG. 4 is a sectional view along B—B line of FIG. 3(a), showing the electromagnet actuating device.

In FIG. 3, 12 is a shutter casing which also serves as the lens mount barrel for a photo-taking lens (not shown). At the central portion of said casing 12 there is an inner tube 13 fixedly mounted through a support wall 11. 5 is a sector drive ring supported by the inner barrel 13 and rotatable about the axis of the photo-taking lens. 4, 4' are shutter blades which serve as diaphragm blades positioned in a space within the photo-taking lens as is known in the art. Of a plurality of blades there are shown only two in the figure. The shutter blade 4 has pins 8 and 9 affixed thereto as is known in the art, one pin 8 being fitted in a hole of the above-described inner barrel 13, and the other pin 9 engaging in a slot 14 of the sector drive ring 5, so that upon rotation of the ring 5, the blade 4 is pivoted about the pin 8 with variation of the size of the opening defined by all the blades. 4' is the only one of the blades which is different from the others in shape, having an extended portion with an opening 18 provided through the wall thereof and arranged to cover and uncover a light-sensitive element 17 positioned in the casing 12. As the size of opening of the diaphragm aperture varies, the amount of light incident upon the photo-sensitive element 17 is controlled in proportion to the diaphragm aperture size.

6 is a spring urging the sector ring 5 to move in the clockwise direction.

7 is a pin planted on the upper surface of the ring 5 and engaging in an elongated slot of a bobbin cap 16 affixed to a bobbin coil 3 to be described later, so that as the coil 3 moves, the ring 5 is rotated.

19 is a pin fixedly mounted on the ring 5; 20 is a stopper arranged upon engagement with the pin 19 to limit the maximum possible amount of rotation of the ring 5, and moveably supported on the casing. By operating a knob 21, the stopper 20 is moved to a desired position and clamped in the position.

Outside of the sector ring 5 there is an electromagnetic actuating device composed of a permanent magnet, coil and yoke and adjusted in position as attached to the support wall 11.

As shown in FIG. 4, an outer yoke 1a is positioned in contact with the support wall 11. Said yoke 1a is constructed in the form of a flat plate having arcuate end portions configured to the inner diameter of the lens barrel 12 and a central portion of linear extension. On the arcuate portions of the yoke 1a are overlaid respective plate-like permanent magnets 2a and 2c of likewise arcuate shape with their S poles contacting with the yoke 1a. Overlaid on the permanent magnets 2a and 2c is an inner yoke 1b of the same shape as that of the yoke 1a, and then thereon are permanent magnets 2b and 2d of the same shape as those of the permanent magnets 2a and 2c respectively with their N poles contacting with the upper surface of the yoke 1b, and then further thereon is an outer yoke 1c of the same shape as that of the above-described ones 1a, 1b. The permanent magnets and the yokes are piled up in sandwiching manner as has been described above, and the linear portion of the inner yoke 1b along with those of the outer yokes 1a and 1c forms spaces in which a coil 3 is arranged to linearly move along the yoke 1b. As shown in FIG. 3(b) and FIG. 4, the coil 3 is convoluted to a narrow long hollow frame of rectangular cross-section with its upper and lower flat coil portions 3a and 3b lie in the above-described respective spaces, while the linear portion of yoke 1b is fitted in the interior of the coil frame.

The above-described individual permanent magnet shells generate the magnetic lines of force flowing in the magnetic paths formed by the yokes as shown by dot-and-dash lines in FIG. 4. The coil 3 is subjected to this magnetic field with its flat portions 3a and 3b opposite to each other being acted on by the magnetic fluxes of opposite direction to each other with respect to the center line E—E. Therefore, the coil 3 is moved to either of the right and left depending upon the direction of flow of the current in the coil. It is noted here that when a rare earth magnet is selected for employment as the permanent magnet, the gaps between the yokes 1a and 1b and between the yokes 1c and 1b may be increased to some extent without causing an unduly large variation of the magnetic flux density. Therefore, the number of turns of the coil can be increased to provide a strong drive power with a smaller electrical energy consumption.

The operation of the electromagnetically controlled shutter of FIGS. 3 and 4 is as follows: When a shutter release is actuated, current flows through the bobbin coil 3, thereby the bobbin coil 3 is moved to the left as viewed in FIG. 3. Then, the sector ring 5 starts to rotate in the counterclockwise direction against the force of the spring 6. This rotation may continue until the stopper pin 19 abuts against the maximum rotation limiting member 20. As the shutter blades are opened, the auxiliary diaphragm aperture 18 is also opened permitting light to be incident upon the photosensitive element 17. When the amount of light received by the photosensitive element 17 has reached a predetermined level, a reverse signal for the bobbin coil 3 is produced, so that the current flows at this time in the reversed direction through the coil 3. The coil 3 is driven to move to the left while simultaneously turning the sector ring 5 in the clockwise direction to close the shutter blades. It is noted here that during the opening operation of the shutter blades, the effective drive force is equal to that obtained by subtracting the force of the spring 6 from the electromagnetic force on the bobbin coil, while during the closing operation, the force of the spring is combined with the electromagnetic force on the coil 3. As a result, an ideal operating characteristic of the semi-open shutter, wherein the size of opening of the shutter is gradually increased, and then rapidly reduced to zero in response to the closing signal, can be easily realized. Further, there is no need to provide a motion transmitting mechanism of complicated structure between the bobbin coil 3 and the sector ring 5. Therefore, the motion of the coil 3 is translated to control the opening and closing operation of the shutter with high efficiency. Another advantage deriving from the very light weight of the coil is that the accuracy and reliability of the exposure time control can be improved by speeding up the opening and closing movement of the shutter. In the above-described embodiment, those of the permanent magnet elements on the opposite side of the inner yoke 1b are oriented so that their N poles face each other with the inner yoke 1b therebetween. This may be modified so that their S poles face each other. In effect, it is required that the magnetic line of force is directed either from the inner yoke 1b to the outer yokes 1a and 1c, or from the outer to the inner yoke.

Figure 5:
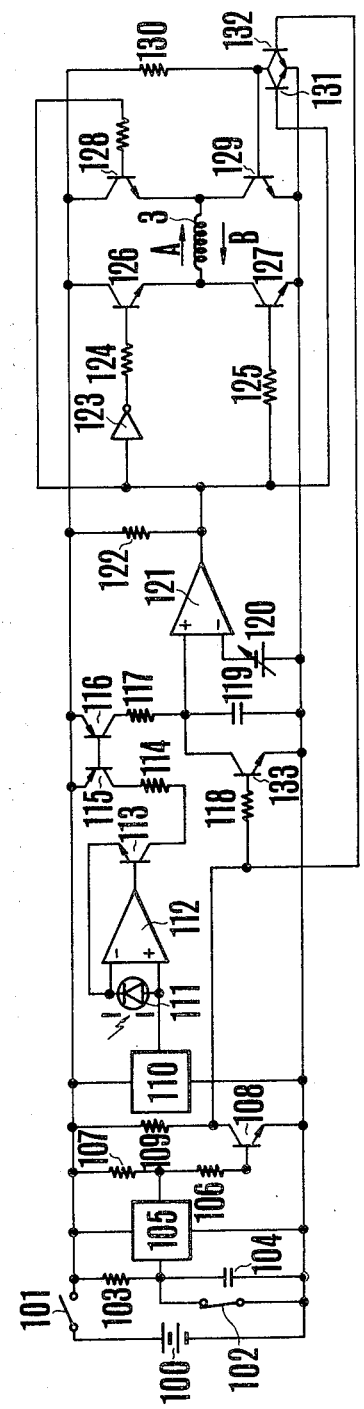
FIG. 5 is an electrical circuit diagram of the electromagnetically controlled shutter of FIGS. 3 and 4.

FIG. 5 shows the circuitry of the electromagnetically controlled shutter. In the figure, 100 is an electrical power source or battery; 101 is a main switch of normally open type arranged to be closed when a release button is depressed to a first stroke. 102 is a normally closed release switch arranged to be opened when the release button is further depressed to the second stroke, or when a focusing completion signal is produced from an automatic focusing apparatus in the camera. A resistor 103 and a condenser 104 constitute a timing circuit. 105 is a timer circuit for preventing chattering at the time of release actuation. 110 is a constant voltage circuit, 111 is a photosensitive element for light measurement, in this instance, use is made of a S.P.C. (silicon photocell) the S.P.C. is connected across two inputs of an operational amplifier 112. 133 is a switching transitor for short-circuiting a condenser 119 with its collector connected to a non-inverting input terminal of a comparator 121. Connected to an inverting input terminal of said comparator 121 is a variable voltage source 121 for producing a signal representative of ASA sensitivity of the used film. 123 is an inverter, and 126, 127, 128 and 129 are transistors for controlling the direction of current flowing through the coil 3.

The circuit of FIG. 5 operates as follows: The operator will first turn on the main switch 101. Since the release switch 102 is closed, the output of the timer circuit 105 is of low level, and the transistor 108 is left open. Therefore, the transistor 133 then is turned on so that an almost zero voltage appears at the non-inverting input terminal of the comparator 121 with production of an output which is of low level, which causes the coil control transistors 127 and 128 to be turned off. Since the above-identified transistor 108 is also OFF, the switching transistor 132 is then turned on, causing the coil control transistor 129 to be turned off. Though the coil control transistor 126 is in a conducting state, the coil 3 is not yet energized because the other coil control transistors 127, 128 and 129 are in the non-conducting state.

When a release of the shutter is actuated, the release switch 102 is opened. In a predetermined time interval dependent upon the resistance 103 and the capacitance 104, the timer circuit 105 changes its output from the low to the high level, causing the transistor 108 to be turned on, and, therefore, causing the transistors 132 and 133 to be turned off. Up to this stage, the output of the comparator 121 remains at the low level, and, therefore, the transistor 131 is in a non-conducting state. Thus, the coil control transistor 129 is turned on. Since the coil control transistors 127 and 128 remains turned off, and the coil control transistor 126 is turned on, the coil 3 is energized by a current flowing in a direction indicated by arrow A, so that the shutter starts to open. At the same time, light passes through the auxiliary diaphragm aperture to impinge upon the above-described S.P.C. 111. Therefore, the condenser 119 is charged to a voltage proportional to the amount of light received by the photosensitive element 111. When the voltage on the condenser 119 has reached the level preset in conformity with the ASA sensitivity of the used film, the output of the comparator 121 changes from the low level to the high level, thereby the coil control transistors 127 and 128 are turned on, while the coil control transistor 126 associated with the inverter is simultaneously turned off. As the switching transistor 131 is also turned on, the coil control transistor 129 is also turned off. Thus, a current is allowed to flow through the coil 3 at this time in the reverse direction indicated by arrow B, so that a closing movement of the shutter starts.

In the above-described embodiment, the photosensitive element 17 is shown as positioned within the lens mount barrel to cooperate with the auxiliary diaphragm means 18 that is provided in unison with the shutter blade 4'. Such arrangement of the photosensitive element may be changed as receiving the reflected light from the film surface in the camera housing. In this case, it is, of course, unnecessary to provide the auxiliary diaphragm 18 on the shutter blade.

Figure 6:
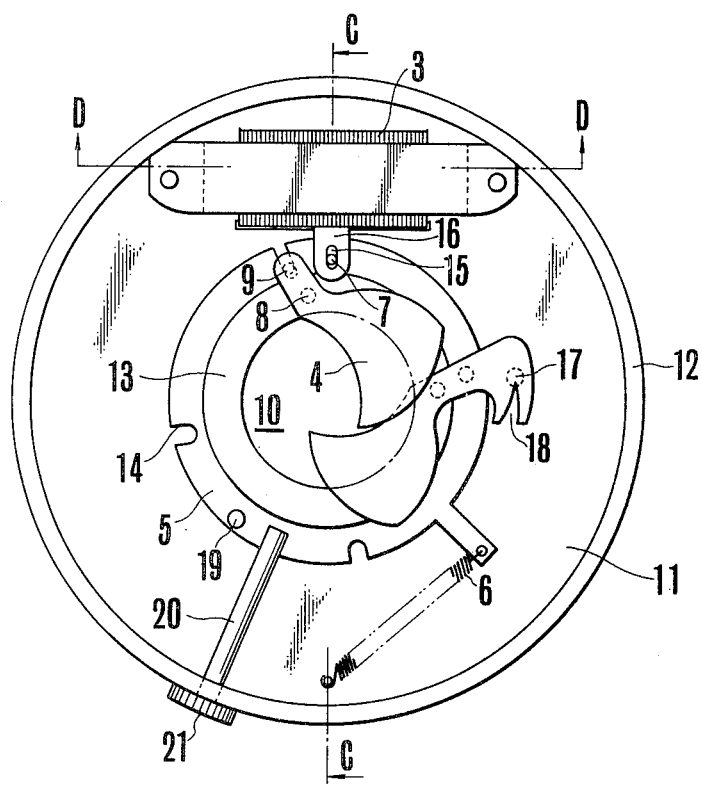
FIGS. 6 and 7 show another embodiment of the present invention with FIG. 6(a) being a front elevational view, FIG. 6(b) being a sectional view taken along a line A—A of FIG. 6(a), and FIG. 7 being a sectional view taken along a line B—B of FIG. 6(a).
Figure 7:
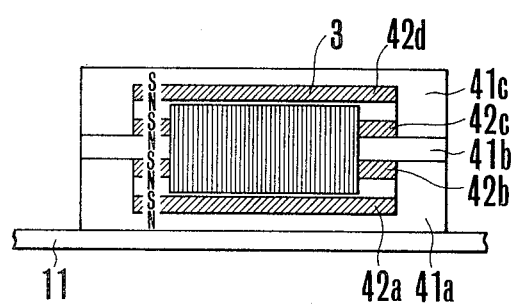

FIGS. 6 and 7 show a second embodiment of the present invention. FIG. 6(a) is an elevational view, FIG. 6(b) is a sectional view taken along C—C line of FIG. 6(a), and FIG. 7 is a sectional view taken along D—D line of FIG. 6(a) showing an electromagnetic actuating device. Even in this embodiment, the shutter control circuit of FIG. 5 may apply.

In FIG. 7, the same reference characters have been employed to denote the similar parts to those shown in FIG. 4. 41a, 41b and 41c are yokes, and 42a, 42b, 42c and 42d are permanent magnets. On either side of the inner yoke 41b, there are two pairs of permanent magnets with their opposite polarities facing each other. The permanent magnets 42a and 42b and yokes 41a and 41b constitute one closed magnetic path. In symmetry with respect to said yoke 41b, the permanent magnets 42c and 42d and yokes 41b and 41c constitute another closed magnetic path. As the coil 3 traverses the magnetic fluxes formed in the gaps between the permanent magnets 42a and 42b and between the permanent magnets 42c and 42d in rectangular directions, therefore, when a current is allowed to flow through the coil 3, the bobbin 3 is linearly moved to either of the left and right depending upon the direction of current flow.

It is noted here that in arranging the two pairs of permanent magnets on the opposite side of the inner yoke 41b, besides the feature that the two magnets in each pair are oriented so that their opposite polarities face each other and are spaced apart from each other by a predetermined distance, there is another feature that those of the polarities of the permanent magnets 42b and 42c which contact with the lower and upper surfaces of the inner yoke 41b must be the same so as not to form a closed magnetic path between the magnets 42b and 42c. In the embodiment of FIG. 7, attached to the upper and lower surfaces of the yoke 41b are both the N poles of the respective permanent magnets. This may be changed so that the S poles do. In this case, the polarity of each of the permanent magnets 42a and 42d facing the respective partner magnets 42b and 42c must be reversed.

In FIGS. 4 and 7, the bobbin coil is only one in number, but may be two as arranged in symmetry with respect to the axis of the lens barrel so as to remove the influence due to the attitude deviation when the barrel is turned.

As has been explained above in detail, according to the present invention, each of the permanent magnets and yokes is constructed in the arcuate or thin plate-like form, and both of these elements constitute a sandwich structure, so that it is possible to incorporate the device in the space within the lens mount barrel of the camera with ease. Another advantage deriving from the simple construction of the bobbin coil due to the allowance for the linear movement thereof is that the low cost production technique can be applied to manufacture bobbin coils. Still another advantage is that, since the bobbin coil of very light weight is used in directly driving the sector ring, a good efficiency of transmission of motion can be assured, and that even when the gap in which the magnetic flux is produced is widened to some extent, the rate of reduction of the magnetic flux density is small, allowing for an increase in the number of turns of the coil, thereby it being made possible to speed up the opening and closing operation of the shutter, as a larger drive power can be obtained with a smaller electrical energy consumption. Further, when the device is provided with a spring as arranged to urge the shutter for closure, the opening speed of the shutter can be slowed down, while the closing speed can be conversely increased. The use of the spring gives another advantage in that vibrations of the shutter blades at the time of closure can be effectively prevented.

What is claimed is:

1. An electromagnetically controlled shutter comprising:
    a plurality of shutter blades;
    a drive member for driving said shutter blades;
    a moving coil connected to said drive member;
    a plurality of flat plate-shaped permanent magnets;
    a plurality of flat plate-shaped yokes; and
    a power source;
    said yokes including one inner yoke and two outer yokes and being arranged to form a plurality of magnetic paths with said permanent magnets interposed between the inner and outer yokes at both end parts of the yokes in a sandwiched laminated manner with two spaces provided for accommodating the moving coil between the inner yoke and the outer yokes in the middle part of the yokes; said moving coil being provided with two flatly-shaped winding parts and being fitted on the outside of a rectangular portion of the inner yoke formed in the middle of the inner yoke; and said moving coil being arranged to linearly move within said spaces so as to cause said shutter blades to be opened or closed through said drive member when the moving coil is energized.

2. An electromagnetically controlled shutter according to claim 1, wherein said yokes are mounted within a shutter casing and include one inner yoke which has both end parts thereof formed into an arcuate shape along the inner circumference of said casing and has the middle part thereof formed into a rectangular shape and outer yokes which are of the same shape as that of the inner yoke; between both end parts of the inner yoke and those of the outer yokes, there are inserted permanent magnets of an arcuate shape; and both parts of said yokes and those of the permanent magnets are laminated in a sandwiched manner.

3. An electromagnetically controlled shutter according to claim 2, further including a spring urging said shutter blade drive member in a closing direction and serving to slow down the opening speed of the shutter blades than the closing speed thereof.

4. An electromagnetically controlled shutter according to claim 3, further including a shutter control circuit, a photosensitive element, and an auxiliary diaphragm for controlling the amount of light incident upon said photosensitive element in cooperation with said shutter blade drive member, whereby said shutter control circuit responsive to the output of said photosensitive element reserves the direction of a current supplied to said coil.

* * * * *